Aug. 16, 1932.    L. S. HOBBS    1,872,291
CARBURETOR
Filed July 16, 1926    3 Sheets-Sheet 1
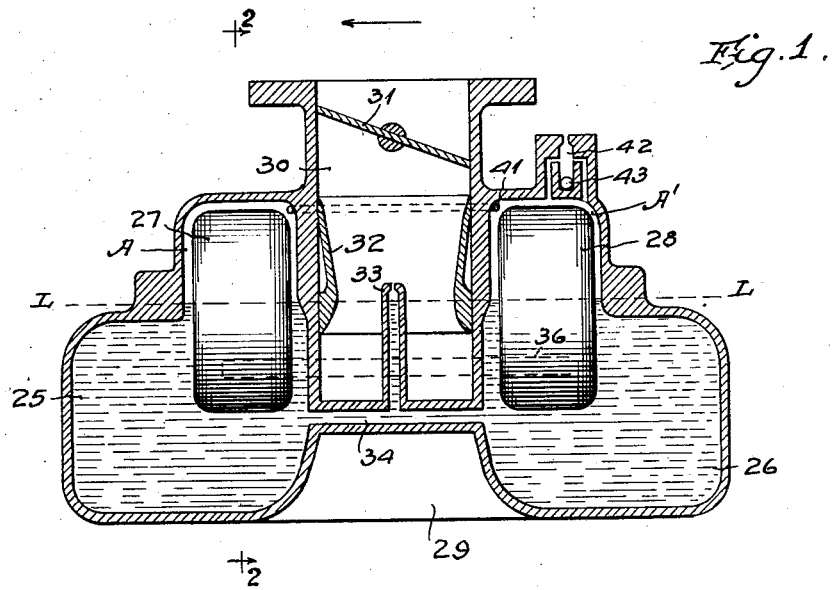
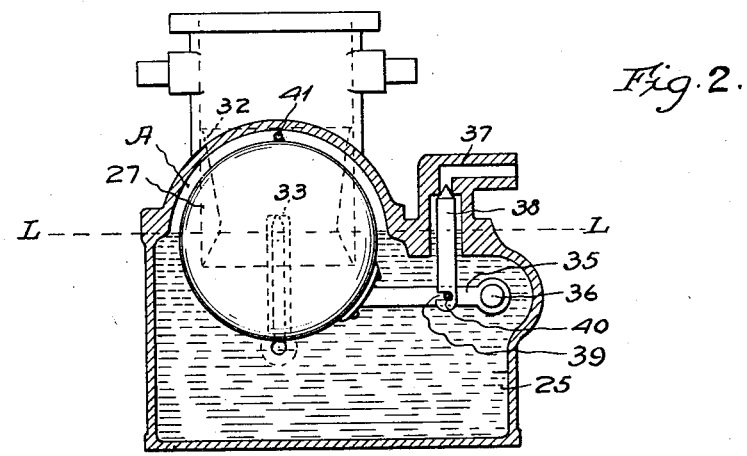
Inventor,
Leonard S. Hobbs
By Brown, Boettcher & Dienner
Attys.

Aug. 16, 1932.  L. S. HOBBS  1,872,291
CARBURETOR
Filed July 16, 1926   3 Sheets-Sheet 2

Inventor,
Leonard S. Hobbs
By Brown, Boettcher, Dienner.
Attys.

Aug. 16, 1932.   L. S. HOBBS   1,872,291
CARBURETOR
Filed July 16, 1926   3 Sheets-Sheet 3

Inventor,
Leonard S. Hobbs
By Brown, Boettcher, Dinner
Attys.

Patented Aug. 16, 1932

1,872,291

UNITED STATES PATENT OFFICE

LEONARD S. HOBBS, OF CHICAGO, ILLINOIS, ASSIGNOR TO BENDIX STROMBERG CARBURETOR COMPANY, OF CHICAGO, ILLINOIS, A CORPORATION OF ILLINOIS

CARBURETOR

Application filed July 16, 1926. Serial No. 122,838.

My invention relates to carburetors and covers structure and arrangement particularly adaptable and useful in aircraft for insuring proper fuel supply under all conditions of flight and operation.

In every float carburetor there must be sufficient air space above the float when the carburetor is in normal position to permit operation of the float to control the fuel inlet valve and thereby the normal level of the fuel. During normal operation the air space is at the top of the float chamber between the float and the chamber top wall, but during certain maneuvers the location of the air space changes as the fuel responds to the force of inertia. During rapid forward acceleration the fuel will lag and the air space will be at the front of the fuel chamber. During rapid retardation the fuel will lead and the air space will then be at the rear of the fuel chamber. During other maneuvers the air space may be at the sides of the fuel chamber or at the bottom. It is the object of my invention to provide such arrangement as will prevent the air space from, at any time, communicating with the fuel outlet from the fuel chamber to the carburetor nozzle, and to keep the outlet entrance sufficiently covered with fuel during any maneuvering or conditions of operation to which the aircraft may be subjected. This can be accomplished by reducing to a minimum the air or clearance space for the float when the carburetor is in normal position, allowing just enough clearance space above the normal fuel level to accommodate the inlet valve and to permit operation of the valve by the float; and by positioning the outlet entrance, in a single float carburetor, a sufficient distance away from the walls of the fuel chamber so that the air space which shifts along the walls, can never communicate with the outlet. In carburetors having more than one float chamber, for example, the Y type of float structure, the float clearance space is also reduced to a minimum and the float chambers are so interconnected that the fuel in one may assist the fuel in the other in preventing the shifting air space from communicating with the passage way to the fuel supply nozzle.

Some arrangements also provide reserve bays or extensions on the float chamber space to store fuel during certain positions of the carburetor and to deliver this fuel during other positions of the carburetor to assist the main body of fuel in keeping the fuel outlet covered.

On the drawings I have shown several types of carburetors and various fuel movements responsive to certain maneuvers of an aeroplane.

On these drawings:

Fig. 1 is a more or less conventional showing of a double float chamber carburetor in vertical diametral section;

Fig. 2 is a sectional view on plane 2—2 of Fig. 1;

Figure 3:
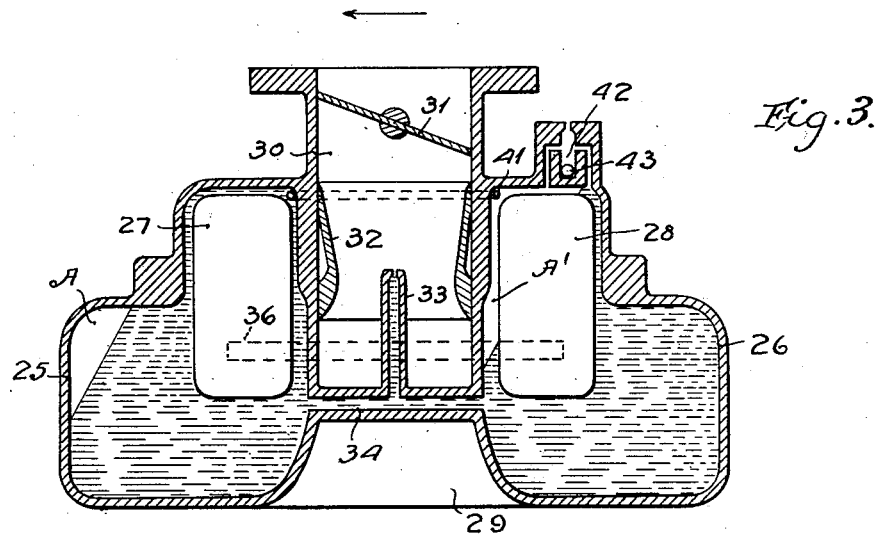
Figs. 3 and 4 are views like Fig. 1 showing different stages of fuel displacement during forward acceleration.

In Figures 1 to 4, is shown in a more or less conventional manner, a Y type of carburetor having two float chambers, one in front and the other in the rear, with the floats rigidly connected to each other and acting as a unit. The front and rear float chambers are represented by 25 and 26 respectively and the floats by 27 and 28. Between the float chambers is the air inlet 29 to the mixing chamber 30 from which the outlet is controlled by the throttle valve 31. The Venturi tube 32 surrounds the nozzle which communicates with the cross duct 34 connecting the float chambers. Each float has a laterally extending supporting arm 35 secured to the shaft 36 which is journaled in the front and rear walls of the float chambers 25 and 26 respectively, the floats being thus secured rigidly to the shaft acting as a unit. Above one of the float chambers is the fuel inlet fitting 37 for the inlet valve 38 which at its lower end has the slot 39 receiving the pin 40 on the supporting arm of the respective float.

Figure 4:
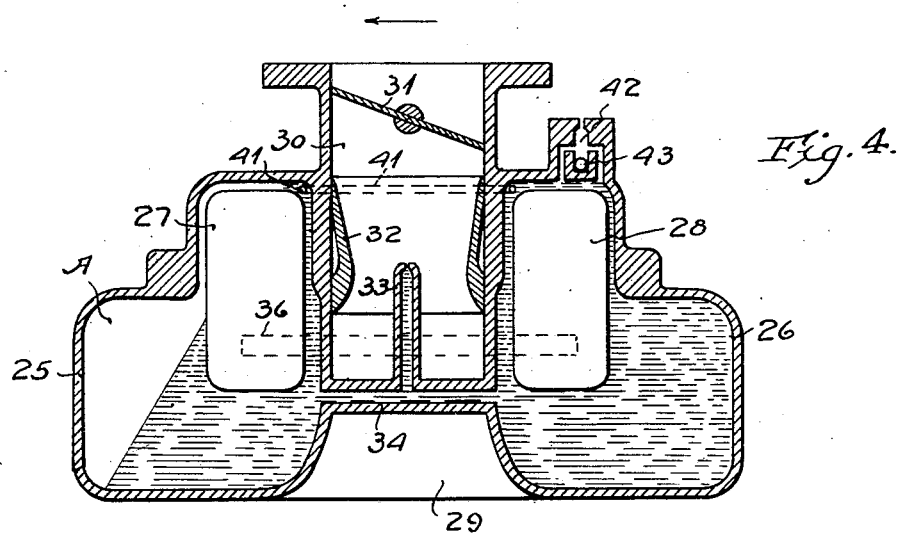

At the upper end the float chambers are connected by an air passageway 41, the float chambers except for this passageway and the fuel duct 34 being disconnected from each other. On top of one of the float chambers is provided an air vent 42 controlled by a check valve 43. The carburetor shape shown in Figs. 1 to 4 is preferable in connection with air craft engines when there is available sufficient vertical room for installation. The depth of fuel below the outlet duct 34 can then be made such, that there will always be an adequate volume to keep the entrance ends of the duct closed to the air spaces during the various maneuvers of the air craft, the respective air spaces A and A' in the float chambers being reduced to a minimum. In Fig. 1 the line L—L shows the normal level of the fuel during normal horizontal flying. Should the air craft suddenly accelerate forwardly along the horizontal the fuel in the float chambers would lag toward the trailing walls of the chambers and the air spaces A and A' would, at the beginning of the maneuver, occupy the spaces indicated in Figure 3. During the continuation of the maneuver the fuel would continue to surge rearwardly and the fuel would flow from the chamber 25 through the duct 34 and into the chamber 26 and the air would be driven out of the chamber 26 through the passageway 41 and into the chamber 25 so that all the air would be in the space A at the front of the carburetor as indicated in Fig. 4. During other maneuvers, also, as for example sudden dipping or elevating, sudden dropping, side flying, upside-down flying, etc., inertia or gravity will cause shifting or surging of the fuel and displacement and shifting of the air spaces, but under all conditions the fuel outlet passageway will be sealed to the flow of air and covered by a sufficient depth of fuel to feed the engine during the duration of any maneuver. To increase the fuel supply, particularly during periods when the fuel inlet valve is closed, the float chamber walls may be extended, Figures 1 to 4 showing the walls extended laterally.

Figure 5:
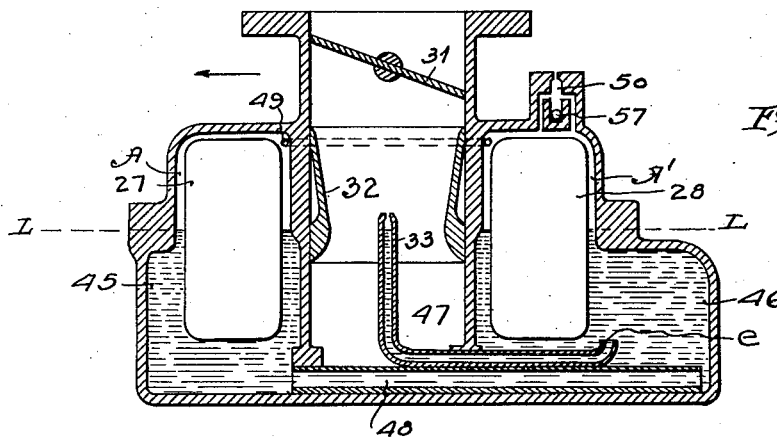
Figs. 5 and 6 are vertical sectional views of a double float chamber carburetor showing a modified arrangement for fuel interflow.
Figure 6:
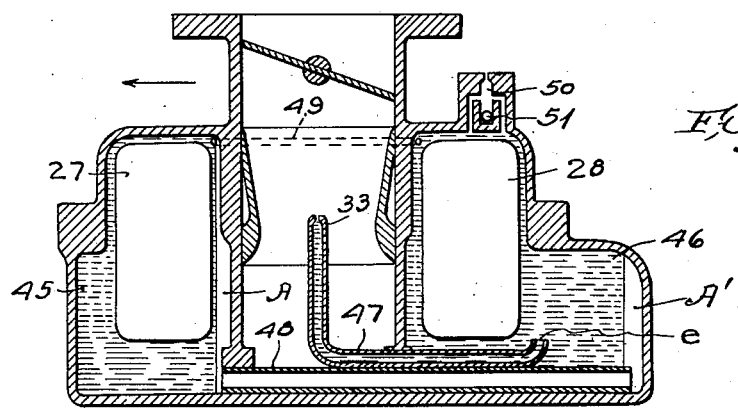
Figure 7:
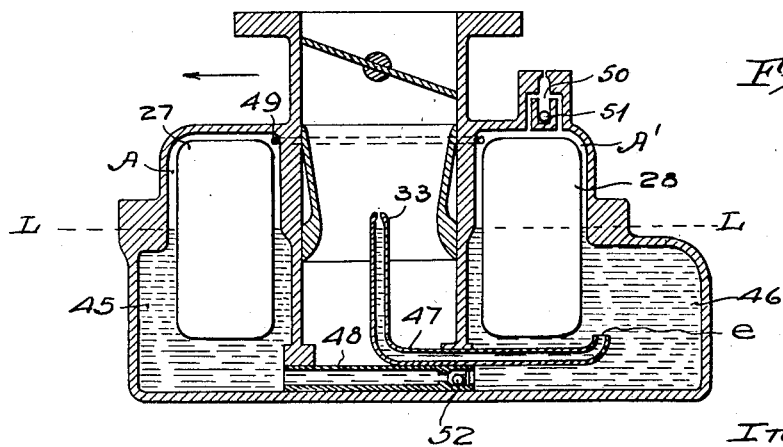
Fig. 7 is a similar view showing another modified arrangement for fuel interflow control.

Figures 5, 6 and 7 show an arrangement adaptable where there is limited vertical installation space. Here the front and rear float chambers 45 and 46 extend only slightly below the fuel outlet duct 47 which feeds only from the fuel chamber 46, this chamber being extended rearwardly to increase its capacity, the entrance e of the outlet passageway communicating with this enlarged space. The float chambers are connected by the passageway or tube 48 for the interflow of fuel, this tube being at the bottom of the chamber and below the outlet passageway 47. In the arrangement of Figures 5 and 6 the tube extends from the inner wall of the fuel chamber 45 and almost to the rear end of the chamber 46. The normal level of the fuel during normal horizontal flying is indicated by the line L—L, Fig. 5 and the air spaces A and A' above this level and the float chambers are interconnected by the air passageway 49, one of the float chambers being open to the atmosphere through the vent 50 which may be controlled by a check valve 51.

During normal horizontal flying the rear end of the tube 48 is covered by fuel within the chamber 46. If now the air craft should accelerate rapidly forwardly, the fuel in the chambers will lag toward the rear walls of the chambers and accordingly displace the air spaces, and if the maneuvers continue, fuel will flow from the chamber 45 into chamber 46 and will drive all the air out of chamber 46 through the passageway 49 into the front chamber 45. The front chamber thus keeps the rear chamber supplied with fuel to insure coverage of the entrance e of the outlet passageway.

If, during forward flight the air craft is suddenly retarded, the fuel will surge forwardly and if the maneuver is continued, the fuel may be located as shown in Fig. 6. During forward surge of the fuel some of the fuel may have flowed from chamber 46 through the duct 48 into chamber 45 but as soon as the fuel surges away from the rear end of the tube, such flow is discontinued. In the chamber 46 the fuel will then fill the entire space with the exception of the air space A' and in chamber 45 the fuel is all at the front with the air space A in the rear. Escape of any material quantity of fuel from the chamber 46 is thus prevented by the tube 48 which acts in the nature of a check valve, and thus the entrance e of the outlet passageway 47 will always be covered to adequate depth during the various maneuverings of the airship. This is true whether the airship movement is horizontally, in inclined direction, laterally, upside-down, or otherwise, the entrance e being in longitudinal and transverse direction substantially at the center of the float chamber space 46.

Instead of extending the tube through the chamber 46 to check the fuel flow from this chamber to the front chamber 45, the tube could be shortened as shown in Fig. 7 to extend only between the inner walls of the chamber and then provided with a proper check valve 52 which during normal flow would permit communication between the chambers and which would permit surging of fuel from the front chamber to the rear chamber, but which would check flow from the rear chamber into the front chamber, thereby insuring at all times adequate supply of fuel and closure of the inlet e in the rear chamber 46. The air vent passageway 41 and 49 are intended to serve only for the interflow of air between the tops of the float chambers. These passageways are so small as compared to the fuel passageways connecting the chambers that during the various air plane maneuverings very little if any fuel will pass through the air vent passageways. Any fuel which might get through would not materially affect the operation of the carburetor, as the fuel supply to the main nozzle will never be interrupted.

Not only will my improved arrangement insure adequate fuel supply to the main nozzle of the carburetor during the various maneuvers of the air craft, but it will also insure adequate fuel supply for the idling well 53 and the accelerating well 54 provided for air craft carburetors. The fuel supply will thus at all times respond for idling operation or when acceleration is desired.

I claim:—

1. In combination in a carburetor, two float chambers, a carburetor barrel between the chambers, a fuel nozzle in said barrel, and a restricted opening passageway below the normal fuel level in said chambers normally establishing constant communication therebetween, the nozzle being connected to receive fuel from only one of the chambers.

2. In combination in a carburetor, two float chambers, a carburetor barrel, a fuel nozzle in said barrel, and a restricted opening passageway below the normal fuel level in said chambers normally establishing constant communication therebetween, the nozzle being connected to receive fuel from only one of the chambers.

3. In combination in a carburetor, two float chambers, a carburetor barrel, a fuel nozzle in said barrel and communicating with one of the chambers for receiving fuel therefrom, and means adapted to normally permit interflow of fuel and equalizing the level between the two chambers, said means preventing such interflow of the fuel under certain predetermined conditions of use of the carburetor.

4. In combination in a carburetor, two float chambers, a carburetor barrel, a fuel nozzle in said barrel and communicating with one of the chambers for receiving fuel therefrom, and means normally establishing uninterrupted communication between the chambers for interflow of fuel therebetween, said means acting to automatically prevent flow of fuel from the chamber with which the nozzle communicates to the other chamber under certain predetermined conditions of use of the carburetor.

5. In combination, in a carburetor, two float chambers, a carburetor barrel, a fuel nozzle in said barrel and communicating with one of the chambers for receiving fuel therefrom, and a restricted fuel flow duct connecting said chambers below the normal fuel level therein, one end of said duct being disposed adjacent the outer wall of the chamber with which the nozzle communicates.

6. In combination in a carburetor, two float chambers, a carburetor barrel, a fuel nozzle in said barrel and opening into one of the chambers remote from the walls thereof and normally at substantially the central portion of the fuel space therein, and a restricted fuel duct connecting the two chambers below the intake of the nozzle.

7. In combination in a carburetor, two float chambers, a carburetor barrel, a fuel nozzle in said barrel and communicating with one of the chambers at substantially the central portion of the normal fuel space thereof, and means normally establishing communication between the two chambers below the normal fuel level therein, said means preventing flow of fuel from the chamber with which the nozzle communicates to the other chamber under certain predetermined conditions of use of the carburetor.

8. In combination in a carburetor, two float chambers, a carburetor barrel, a nozzle in the barrel and communicating with one of the chambers for receiving fuel therefrom, a shaft rockably mounted through said chambers, floats in the chambers and secured to the shaft, said shaft providing a rigid connection between the floats, said chambers having restricted communication below the normal fuel level thereof, and a fuel inlet valve controlled by the floats.

9. In combination in a carburetor, two chambers, a barrel, a nozzle in the barrel, and a restricted passage establishing communication between the two chambers below the normal fuel level therein, said nozzle communicating with one of the chambers at substantially the central portion of the normal fuel space thereof.

10. In combination in a carburetor, a pair of interconnected fuel chambers, a barrel between the chambers, and a nozzle in the barrel and communicating with the chambers at substantially the central portion of the normal fuel space of one of the chambers.

11. In a carburetor, a pair of spaced fuel chambers having level controlling means and interconnecting fuel and air passageways, said fuel chambers having the volume of the space normally above the fuel level less than the volume of the fuel, and a fuel outlet from one of the chambers leading from substantially the center of the volume of fuel therein.

12. In a carburetor, a fuel chamber normally having a constant fuel level and a fuel outlet leading from a point spaced from the sides and bottom of the chamber, said fuel chamber having a total volume such that inversion of the carburetor causes the fuel to assume a level above the fuel outlet, an air vent for said air chamber, and means for closing the vent when the carburetor is inverted.

13. In a carburetor, the combination of a front float chamber and a rear float chamber, a carbureting chamber between said float chambers, a fuel nozzle for supplying fuel to said carbureting chamber and connected to receive fuel supply from the rear float chamber, and an intercommunicating passageway extending from the rear wall of the front float chamber to within a short distance of the rear wall of the rear float chamber, said tube serving as a check to limit the flow of fuel from the rear float chamber to the front chamber.

14. In a carburetor, the combination of a front float chamber and a rear float chamber, a carburetor barrel between said chambers, a fuel nozzle projecting into said barrel and connected with said rear float chamber for fuel supply, a fuel intercommunicating passageway between the bottoms of said float chambers, means for checking the flow from said rear float chamber through said intercommunicating passageway to the front float chamber, and means for venting the tops of said float chambers.

15. In a carburetor, the combination of a front float chamber and a rear float chamber, a carburetor barrel between said chambers, a fuel nozzle projecting into said barrel and connected to be fed from the rear fuel chamber, and means for permitting ready flow from the front chamber to the rear chamber, but for checking the flow from the rear chamber to the front chamber.

16. In a carburetor, the combination of a front float chamber and a rear float chamber, a carburetor barrel between said chambers, a fuel nozzle projecting into said barrel and connected with one of said float chambers to receive fuel therefrom, a fuel intercommunicating passageway between said float chambers, and means for checking the fuel flow in one direction through said passageway.

17. In a carburetor, the combination of two float chambers, a carburetor barrel between said chambers, a fuel nozzle in said barrel connected to receive fuel from but one of said float chambers, and a restricted passageway below the normal fuel level in said chambers forming the sole fuel flow connection between said chambers.

18. In an aeroplane carburetor, the combination of a front float chamber and a rear float chamber, a carburetor barrel between said chambers, a fuel nozzle projecting into said barrel and connected to receive fuel supply from said float chambers, a fuel flow duct interconnecting said chambers below the normal fuel level therein, and an air vent connected with said chambers above the normal fuel level therein, said chambers with the exception of said duct being disconnected from each other so far as material interflow of fuel is concerned.

19. In an aeroplane carburetor, the combination of two distinct float chambers spaced from each other by a substantial distance, a float in each chamber, said floats being rigidly connected to move together, a fuel inlet valve for said chambers controlled by said floats, the float chambers and floats being designed to provide an air space in each chamber of just sufficient volume to permit functioning of the floats to control the inlet valve when the carburetor is in normal position, a restricted fuel passage forming the sole connecting means between said chambers below the normal fuel level, and a fuel nozzle connecting with said passage at a point between said chambers.

20. In a carburetor, the combination of two distinct float chambers spaced from each other by a substantial distance, a carburetor barrel between said chambers, a float in each chamber, said floats being rigidly connected to move together, a fuel inlet valve for said chambers controlled by said floats, a restricted fuel passage connecting said chambers below the normal fuel level, and a nozzle projecting in said carburetor barrel and connected to receive fuel from said passage.

21. In an aeroplane carburetor, the combination of two distinct float chambers spaced from each other by a substantial distance, a carburetor barrel between said chambers, a float structure comprising a float in each chamber, a fuel inlet valve for said chamber controlled by said float structure, said floats being normally at the upper parts of said chambers with just sufficient surrounding air space to permit functioning of the float structure to close the inlet valve, a restricted fuel passage between the chambers below the normal fuel level and forming the sole fuel connection between the chambers, and a fuel nozzle in said barrel connected to receive fuel from said passage.

22. In a carburetor, a pair of spaced float chambers, a mixing chamber intermediate said chambers, a passageway interconnecting said chambers below the normal fuel level therein, an air passage interconnecting said chambers above the normal fuel level, a fuel nozzle in said mixing chamber, said fuel nozzle having an inlet opening within one of said fuel chambers, said inlet being located intermediate the normal level and the bottom of the chamber.

23. In a carburetor, a pair of spaced float chambers, a mixing chamber intermediate said chambers, a passageway interconnecting said chambers below the normal fuel level therein, an air passage interconnecting said chambers above the normal fuel level, a fuel nozzle in said mixing chamber, said fuel nozzle having an inlet opening within one of said fuel chambers, said inlet being located intermediate the normal level and the bottom of the chamber, said fuel chambers having a gravity controlled air vent, and a float in each of said fuel chambers having interconnecting means whereby they operate as a unit.

24. In a carburetor, a plurality of float chambers, a float in each of said chambers, a fuel inlet valve, means operatively connecting both of said floats to said valve, and a fuel passage normally permitting equalization of the fuel level in the chambers and constituting the sole fuel flow communication therebetween.

In witness whereof, I hereunto subscribe my name this 8th day of July, 1926.

LEONARD S. HOBBS.